US007881974B1

(12) United States Patent
Thirumalai et al.

(10) Patent No.: US 7,881,974 B1
(45) Date of Patent: Feb. 1, 2011

(54) MANAGING TEXTUAL DESCRIPTIONS BASED ON QUALITY RATING

(75) Inventors: Srikanth Thirumalai, Clyde Hill, WA (US); Xiaoxin Yin, Urbana, IL (US)

(73) Assignee: Amazon Technologies, Inc., Reno, NV (US)

( * ) Notice: Subject to any disclaimer, the term of this patent is extended or adjusted under 35 U.S.C. 154(b) by 681 days.

(21) Appl. No.: 11/774,346

(22) Filed: Jul. 6, 2007

(51) Int. Cl.
*G06Q 30/00* (2006.01)
*G06F 17/30* (2006.01)
(52) U.S. Cl. .......................................... 705/26; 705/27
(58) Field of Classification Search ................... 705/26, 705/27; 707/687, 690, 703
See application file for complete search history.

(56) References Cited
U.S. PATENT DOCUMENTS
2001/0014868 A1* 8/2001 Herz et al. ..................... 705/14
2004/0199430 A1* 10/2004 Hsieh ............................ 705/26

OTHER PUBLICATIONS

Machine Assistance in Collection Building: New Tools, Research, Issues, and Reflections Mitchell, Steve Information Technology & Libraries ? v25n4 ?pp: 190-216 Dec. 2006.*

* cited by examiner

*Primary Examiner*—Jeffrey A Smith
*Assistant Examiner*—Resha Desai
(74) *Attorney, Agent, or Firm*—Robert C. Kowert; Meyertons, Hood, Kivlin, Kowert & Goetzel, P.C.

(57) ABSTRACT

A system and method for managing reconciled textual descriptions based on merchant quality rating are provided. Merchants providing items to an electronic marketplace submit merchant values corresponding to textual descriptions of attributes of the item. A merchant value analyzer component processes multiple merchant descriptions to select a set of textual descriptions based on a comparison of the textual descriptions and merchant quality ratings. Additionally, a merchant quality analyzer component calculates updated merchant quality ratings based on the submitted merchant values.

23 Claims, 4 Drawing Sheets

MANAGING TEXTUAL DESCRIPTIONS BASED ON QUALITY RATING

BACKGROUND

One aspect associated with the widespread usage of communication networks generally, in the Internet particularly, has been the emergence of electronic marketplaces. Electronic marketplaces typically are a network site that offers an interface, such as a Web page, to consumers via a communication network. In one embodiment, the electronic marketplace can facilitate the sale of a wide variety of items that are offered by multiple merchants via the electronic marketplace. In this embodiment, the electronic marketplace can maintain a centralized catalog of items offered for sale by each merchant along with information about the specific items offered by the merchant. The centralized catalog approach provides consumers with a mechanism for comparing merchandise, comparing prices, and making their purchases from a wide variety of merchants all within the same electronic marketplace.

Given the potential large volumes of items being offered for sale by a wide variety of merchants, the information concerning the items provided by the merchant becomes very important. In a specific example, two or more merchants may be offering the same item, or relatively the same, for sale, which facilitates price comparison and purchasing diversity. At the same time, however, it can be difficult for the electronic marketplace to select the information that best describes each particular item, especially if there are differences between the information provided by each merchant. For example, each merchant may provide slightly different information that describes aspects of an item for sale, such as item title/name, descriptions, etc. Accordingly, the electronic marketplace may have to make decisions as to the information that is provided to a consumer in the electronic marketplace, generally referred to as information reconciliation. Current approaches to information reconciliation relate to a manual analysis of each submission and/or an arbitrary selection of information from a designated merchant.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to the management of descriptions of items from a plurality of merchants. Specifically, in one aspect, the present invention relates to the selection and management of textual descriptions for specific items from an item catalog based, in part, on a rating of cumulative quality of the descriptions from each submitting merchant. In another aspect, the present invention relates to the determination of ratings for the cumulative quality of descriptions of submitting merchants based upon a comparison of item descriptions from a particular merchant relative to other submitting merchants. Although the present invention will be described with regard to illustrative examples, operating environment and component interaction, one skilled in the relevant art will appreciate that the disclosed embodiments should not be construed as limiting.

Figure 1:
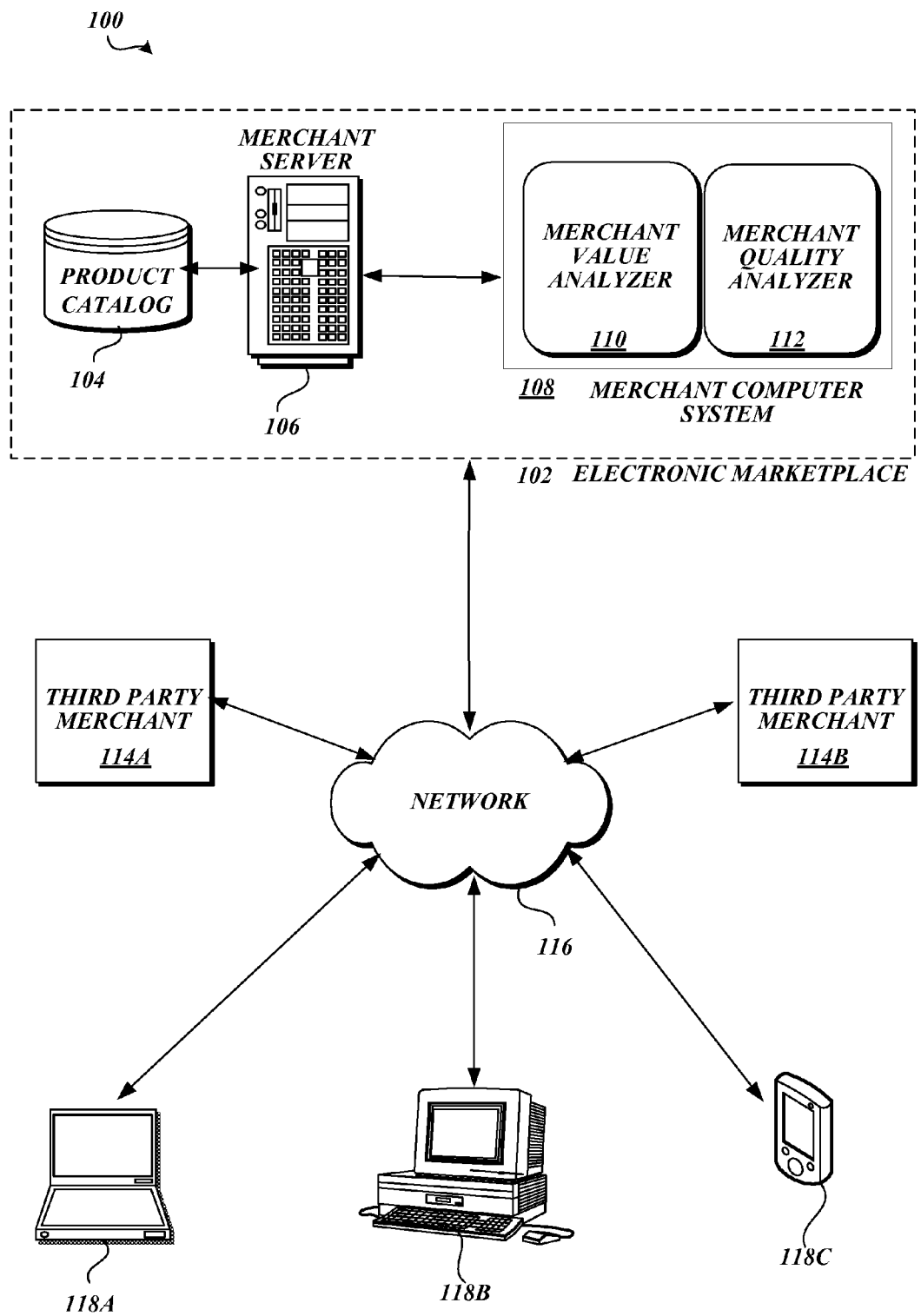
FIG. 1 is a pictorial diagram of an illustrative networked environment for facilitating item information reconciliation from a variety of third party merchants.

FIG. 1 provides an illustrative overview of a distributed computing environment 100 in which embodiments of the invention may be implemented. The environment 100 includes an electronic marketplace 102 that includes, but is not limited to, an item catalog database 104, a merchant server 106, and a merchant computing system 108. The electronic marketplace 102 allows consumers, via their client devices 118a-118c, to view and purchase items offered for sale or lease on the electronic marketplace. The product catalog database 104 is communicatively connected to a merchant server 106. The merchant server 106 provides an interface for each of the client devices 118a-118c. The item catalog database 104 includes information on all items offered for sale within the electronic marketplace 102. In an illustrative embodiment, each entry in the item catalog database 104 can correspond to a structured, or semi-structured, set of data describing various aspects of a particular item. For example, an item catalog database entry for a particular book for sale may include information regarding author, title, publisher, keywords, executive summaries, and the like.

With continued reference to FIG. 1, the merchant computing system 108 can include, but is not limited to, a merchant value analyzer component 110 and a merchant quality analyzer component 112. In an illustrative embodiment, the merchant value analyzer component 112 obtains a set of merchant submission, e.g., merchant values, from each merchant selling an item and determines which merchant values adequately describe the item. The selection of a particular merchant value can be based on a calculated value of merchant quality descriptions (e.g., a merchant quality score). In another illustrative embodiment, the merchant quality analyzer component 110 determines a merchant quality score for each merchant based on the quality of information that they provide.

The computing environment 100 includes third-party merchants 114a and 114b. Third-party merchants 114a and 114b offer items for sale within the electronic marketplace 102. The computing environment 100 also includes client devices 118a, 118b, and 118c. Consumers use the client devices 118a, 118b, and 118c to access products offered for sale within the electronic marketplace 112.

The electronic marketplace 112, third-party merchants 114a and 114b, and the client devices 118a, 118b and 118c are all communicatively connected to the network 116. The network 116 may be a Local Area Network ("LAN"), a larger network such as a Wide Area Network ("WAN"), or a collection of networks such as the Internet. Because protocols for network communication such as TCP/IP are well known to those skilled in the art of computer networks, further description of these protocols and other methods used to implement the network 116 are not provided herein.

Figure 2:
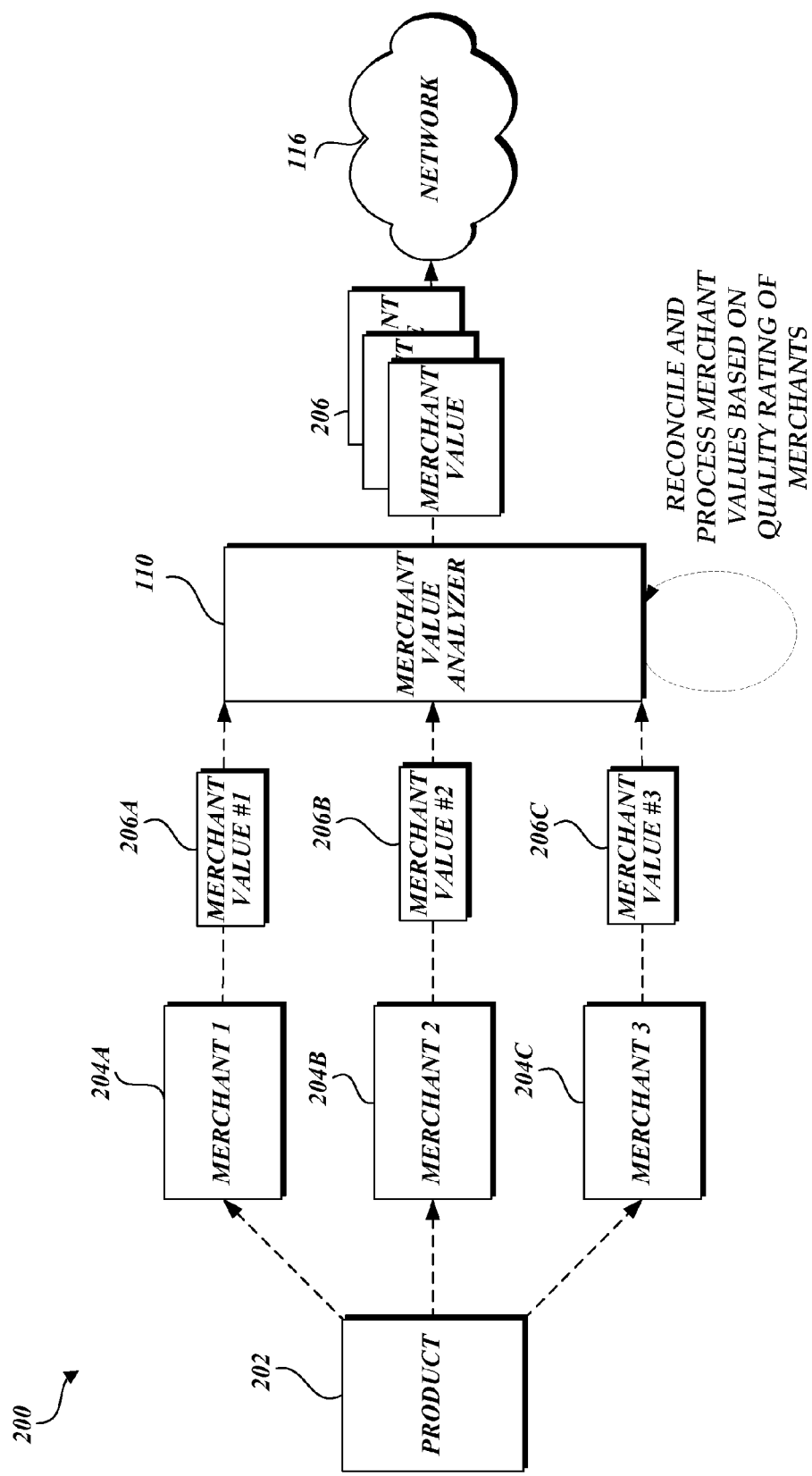
FIG. 2 is a block diagram of a framework for item information reconciliation based on a plurality of merchant values in accordance with an embodiment of the present invention.

FIG. 2 is a block diagram depicting a process in which a merchant value is selected to describe a product being offered for sale by multiple merchants. In an illustrative embodiment, the merchant value can correspond to a textual description for an aspect of identified items, such as a technical specification for an electronic item. In another embodiment, the merchant value can correspond to a set of textual descriptions for multiple aspects of identified items, such as all or a substantial portion of textual descriptions for the electronic item. With reference to FIG. 2, a product 202 corresponding to an item in the item catalog 104 is offered for sale by Merchant 1 204a, Merchant 2 204b, and Merchant 3 204c. In an illustrative embodiment, each merchant submits a merchant value that identifies aspects of the product 202. In an illustrative embodiment, each Merchant 204a-204c submits a merchant value that corresponds to textual description for various aspects of the identified item. The merchant value can also include no data, or empty sets, for any aspect in which a merchant has no textual description. For example, a merchant value for a publication could include a submission of textual descriptions by a merchant of title, author, publisher, IBSN identifier, keywords, summary, table of contents, and the like. One skilled in the art will recognize that there are a number of characteristics that can be used as merchant value. Thus, the characteristics listed here should not be construed as limiting.

With continued reference to FIG. 2, Merchant 1 204a submits merchant value #1 206a. Merchant 2 204b submits merchant value #2 206b. Merchant 3 204c submits merchant value #3 206c. The merchant value analyzer component 110 receives merchant values 206a, 206b, and 206c from the merchants and determines first that all three merchant values 206a-206c correspond to the same item in the item the catalog, referred to as item matching. An example of a system for item matching of merchant values is described in co-pending, commonly assigned U.S. application Ser. No. 11/754,237, entitled DUPLICATE ENTRY DETECTION SYSTEM AND METHOD, and filed on May 25, 2007. U.S. application Ser. No. 11/754,237 is incorporated by reference herein.

Upon matching the submitted merchant values, the merchant value analyzer component 110 determines from the set of merchant values the textual descriptions that best describe the product 202. In an illustrative embodiment, the merchant value analyzer component determines the textual descriptions based on a comparison of all the textual descriptions factored by a cumulative quality rating for each of the submitting merchants. In the diagram 200, a set of textual descriptions 206 are determined to best identify the product 202. A process for selecting specific textual descriptions will be discussed in more detail in conjunction with FIG. 3.

For example, assume that the target product corresponds to a Major League Baseball cap emblazoned with a particular team logo and that item catalog database 108 includes an entry for each separately identifiable cap. Merchant 1 (204a) may submit a merchant value including a product textual description as "Major League Baseball memorabilia." Merchant 2 (204b) may submit a merchant value including a product description as a "baseball cap." Further, Merchant 3 (204c) may submit a merchant value including a product description as a "Mariners Major League Baseball Cap." While each of these merchant values includes textual descriptions that have information identifying the product, in an illustrative embodiment, the merchant value analyzer component 112 identifies which one of the textual descriptions from the submitted merchant values 206a-206c best describes the product. This identification is based on a comparison of the three submissions, "Major League Baseball memorabilia," "baseball cap," and "Mariners Major League Baseball Cap". Additionally, the merchant value analyzer component 112 may further process the submissions by weighing a previously compiled rating of cumulative quality for each submitting merchant, Merchants 206a-206c. In this example, the merchant value analyzer component 112 selects that the textual description that best identifies the product was submitted by Merchant 3, "Mariners Major League Baseball Cap." The merchant value analyzer component 112 then repeats the selection routine for each potential aspect of an identified item to generate a cumulative set of textual descriptions 206.

Figure 3:
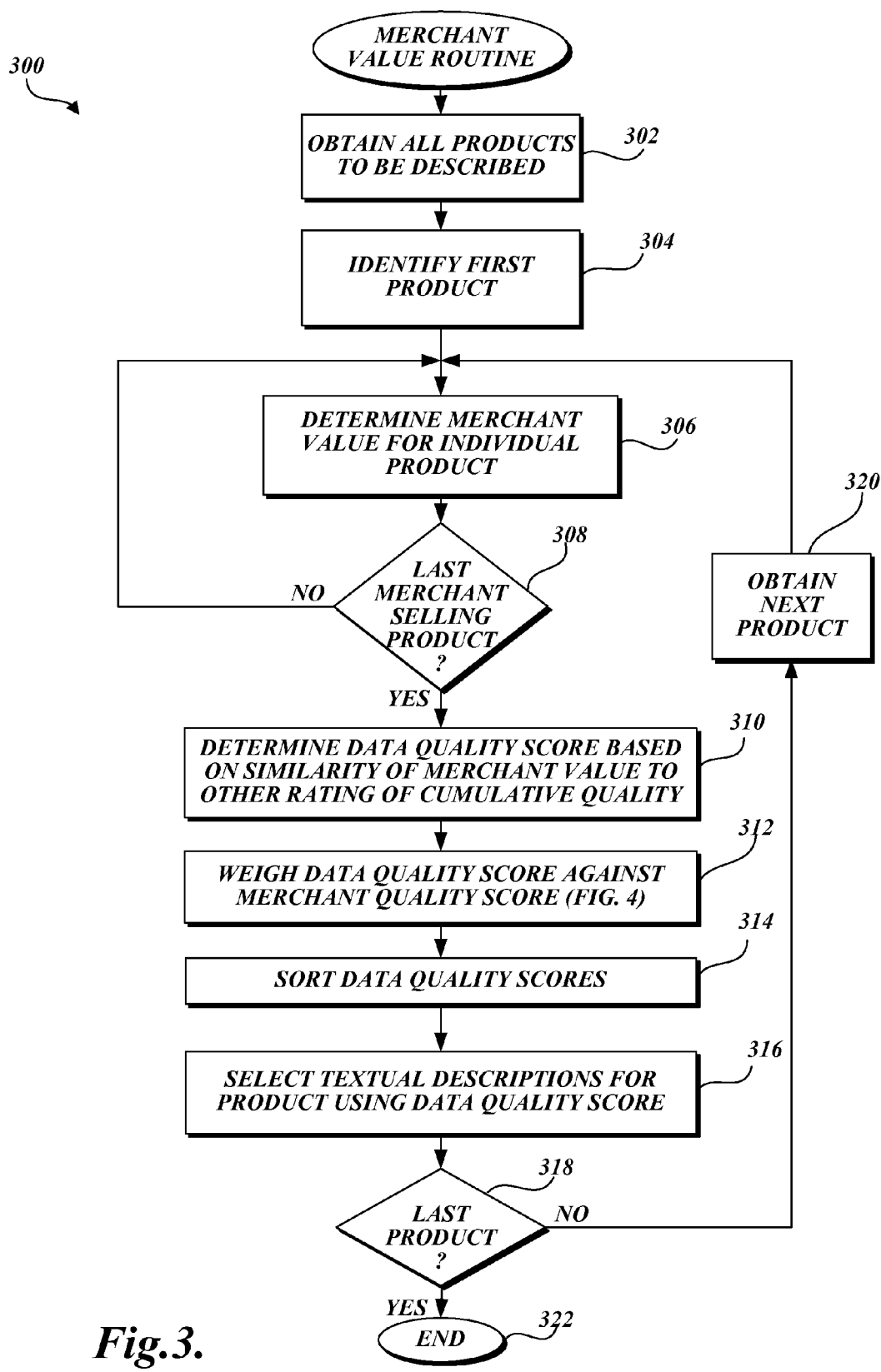
FIG. 3 is a flow diagram of an item information reconciliation routine implemented by a service provider in accordance with an embodiment of the present invention.

With reference now to FIG. 3, a flow diagram illustrative of a sample merchant value routine 300 used by the merchant value analyzer 210 to determine a set of textual descriptions from the submitted, reconciled merchant values for an identified product will be described. As previously mentioned, a submitted merchant value can include textual descriptions for different aspects of a product. With reference to FIG. 3, at block 302, the merchant value analyzer component 110 obtains a set of products in which textual descriptions will be selected. In an illustrative example, the merchant value analyzer component 110 may receive a set of merchant values from any number of submitting merchants. Based on the merchant values, the merchant value analyzer component 110 may select textual descriptions for the identified products or update existing textual descriptions based on the newly submitted merchant values.

At block 304, a first product is identified. At block 306, a merchant value for the individual product identified in block 304 is determined. In one embodiment, the merchant value corresponds to the submission of textual description for a set of available attributes/aspects of an identified item. For example, a merchant value for an electronic item may include textual descriptions for title/identifier, manufacturer, dimensions, color, weight, reviews, technical support, etc. At block 308, a determination of whether this is the last merchant selling the individual product is determined. If it is determined at block 308 that the merchant is not the last merchant selling the product, the routine 300 returns to block 306. As previously described, the merchant value analyzer component 110 can implement a matching routine in the determination of merchant values that correspond to the same, or substantially the same, item.

If it is determined at block 308 that this is the last merchant selling the product, the merchant value analyzer component 110 has compiled the set of all merchant value submissions and the routine 300 proceeds to block 310. At block 310, the merchant value analyzer component 110 determines a data quality score for each textual description with a merchant value based on the similarity of the textual description for the target merchant value compared to textual descriptions for the other merchant values in the compiled set of all merchant value submissions. For example, if the set of submitted merchant values corresponds to merchant value submissions from four merchants, the merchant value analyzer component 110 compares a corresponding textual description from a target merchant value to the textual descriptions from the other three submitted merchant values. A resulting cumulative data quality score for the particular textual description would be calculated as the average of the individual data quality scores from each comparison. The merchant value analyzer component 110 could then repeat the process for the other submitted merchant values.

In one embodiment, the data quality score can correspond to a numerical value selected from a range of values. For example, a data quality score can be selected from a range of 1 to 0, in which a value of "1" represents identical values and a value of "0" represents no similarity in value. In an illustrative embodiment, the merchant value analyzer component 110 can utilize any one of a variety of string comparison algorithms to generate data quality scores.

At block 312, the cumulative data quality score for each textual description can be further weighted by the rating of cumulative quality for each submitting merchant. The merchant quality score is a score determined for each merchant based on the overall quality of information provided by a merchant. As stated earlier, an electronic marketplace can contain varying numbers of third-party merchants. Generally, a merchant value that is common amongst a majority of the merchants within the electronic marketplace has a higher probability of being correct. However, there could also be cases where a majority of the merchants have incorrectly or inadequately identified a product. Additionally, a smaller marketplace with only two or three merchants could be in danger of improperly identifying an item. In an illustrative embodiment, the rating of cumulative quality for each merchant can be represented as a numerical value that is multiplied with the data quality score for each textual description in a merchant value. The calculation of rating of cumulative quality for each merchant by the merchant quality analyzer component 112 will be discussed in more detail in conjunction with FIG. 4.

At block 314, the merchant value analyzer component 110 sorts the processed data quality scores and selects a textual description for each available attribute of the identified product using the data quality score. At decision block 318, a determination is made if this is the last product to be described. If it is determined that the current product is not the last product to be described, the routine 300 goes to block 320, where the next product is obtained. From there, the routine 300 moves back to block 306. If it is determined that the current product is the last product to be described, the routine 300 terminates at block 322.

Figure 4:
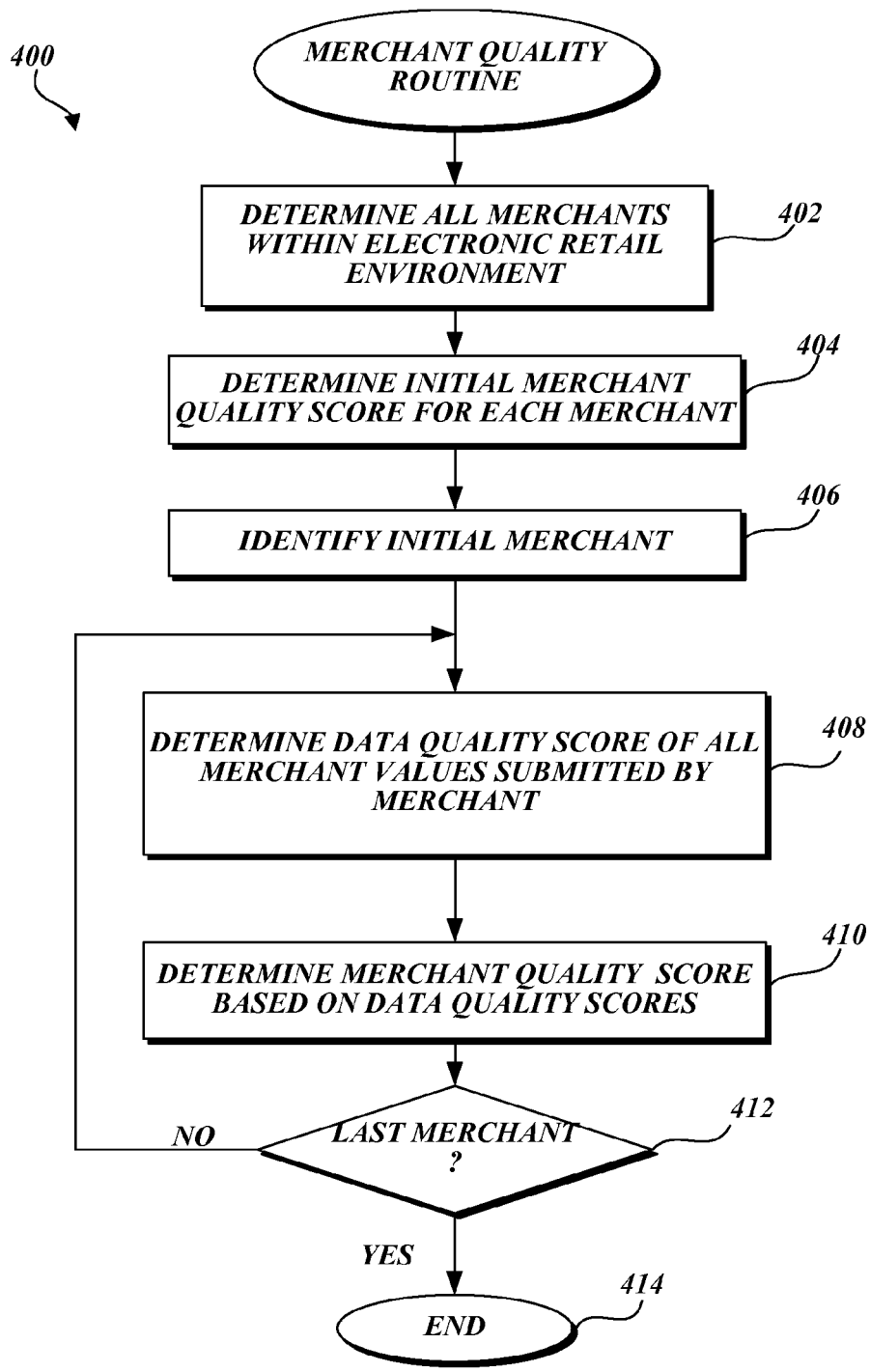
FIG. 4 is a flow diagram of a merchant item information quality determination routine implemented by a service provider in accordance with an embodiment of the present invention.

FIG. 4 is a flow diagram of a sample merchant quality routine 400 which determines a rating of cumulative quality for each merchant in the electronic marketplace 102. At block 402, the merchant quality analyzer component 112 determines all merchants within the electronic marketplace 102 that have submitted merchant value submissions. Each merchant is given an initial merchant quality score at block 404. In one embodiment, all merchants are initially considered to provide quality information. For instance, each merchant can be initially awarded a merchant quality score of "1," which is representative of a highest data quality score as described above. As the merchant continues to provide merchant values, their score will adjust according to the quality of the information they provide. In another embodiment, a new merchant may be provided an initial data quality score equal to an average of other merchant or allocated an initial data quality score corresponding to a merchant determined to be similar to the new merchant. As the merchant continues to provide merchant values, their score will adjust according to the quality of the information they provide similar to pre-existing merchants.

At block 406, the merchant quality analyzer component 112 identifies a next merchant. The data quality score of all the textual descriptions in the merchant values submitted by the merchant are obtained at block 408. For example, if the identified merchant has submitted 10 merchant values, the merchant quality analyzer component 112 will determine the data quality scores for each of the textual descriptions. These data quality scores allow the merchant quality analyzer component 112 to determine which merchants in the electronic marketplace submit quality information. A merchant who has good data quality scores submits good information concerning products. This will result in a better merchant quality score. Conversely, a merchant who has low data quality scores submits poor information concerning products and will have a lower merchant quality score.

At block 410, a rating of cumulative quality is determined based on the data quality scores of the merchant values obtained in block 408. For example, in an illustrative embodiment, a range of merchant quality scores may be set at "0" to "1". The initial merchant quality score for the merchant may be set at "1". If the merchant has submitted 3 merchant values with data quality scores with an average of "0.7", the merchant quality of score of the merchant will be adjusted based on those data quality scores. For instance, the initial merchant quality score may be divided by the average data quality score to determine the final merchant quality score. One skilled in the art will recognize that there are numerous ways to mathematically calculate the merchant quality score. Thus, the example used is presented for purposes of example only and should not be construed as limiting.

In another embodiment, a subset of all a merchant's data quality scores may be used to compute the merchant quality score. These subsets can be based on a number of different parameters. For instance, if a user has submitted ten merchant values, only statistically consistent scores can be used to determine the merchant quality score. For example, the best scores and the worst score may be removed. Alternatively, any data scores deviating beyond a threshold amount from an average data score may be discarded. Still further, a "sliding window" of a pre-determined number of data value scores may be used. For example, only the 50 latest merchant values may be used if calculating the average merchant quality score. In still another embodiment, another subset can be created based on the dates the merchant values were submitted by the merchant. For example, a merchant within the electronic marketplace for several years could go a long period without submitting merchant values. While the earlier submissions by the merchant may have been high quality, the new submissions are not. Thus, by specifying a particular range of dates for merchant values and only using those in the determination of a merchant quality score, the electronic marketplace can identify trends in the quality of information provided by a merchant.

Returning to the routine 400, at decision block 412, a determination is made of whether the current merchant is the last merchant within the electronic marketplace. If the merchant is not determined to be the last merchant, the routine 400 returns to block 408. If the merchant is determined to be the last merchant, the routine 400 moves to block 414 where it terminates.

While illustrative embodiments have been illustrated and described, it will be appreciated that various changes can be made therein without departing from the spirit and scope of the invention. For example, in some embodiments, a merchant may be associated with multiple average data scores associated with various characteristics. For instance, a large merchant may offer a wide variety of products for sale from appliances to electronics. To ensure quality in the descriptions of those products, a merchant may have an average data score dependent on the category of the product. For instance, a merchant may be associated with an "appliances" average data score for merchant values related to appliances. Likewise, the merchant may have a separate "electronics" average data score for merchant values associated with electronics.

In another embodiment, merchant value submissions may be associated with the specific individuals descriptions for items. For example, a merchant could have two persons who are responsible for submitting descriptions of products. In this embodiment, the individual and merchant are associated with the average data score. Thus the average data score of another individual would not affect another individual submitting a merchant value on behalf of a merchant.

The embodiments of the invention in which an exclusive property or privilege is claimed are defined as follows:

1. A computer-implemented method for managing product descriptions, comprising:
    identifying a product;
    obtaining a first merchant value for a first merchant selling said product, wherein the first merchant value contains a set of textual descriptions for attributes of the product;
    determining, using a computer, data quality scores for textual descriptions in the first merchant value, including, for each textual description in the first merchant value:
        comparing, using a computer, the textual description in the first merchant value to a textual description contained in a second merchant value submitted by a second merchant, to determine a textual description similarity score;
        weighting, using a computer, the textual description similarity score based on a cumulative data quality rating associated with the second merchant to determine a weighted textual description similarity score; and
        combining multiple weighted textual description similarity scores for the textual description in the first merchant value to determine a data quality score for the textual description in the first merchant value;
    storing the first merchant value and the data quality scores with a stored plurality of merchant values and data quality scores; and
    selecting a set of textual descriptions for said product from the stored plurality of merchant values and data quality scores, wherein the set of textual descriptions is selected based on the stored data quality scores and cumulative data quality ratings associated with each respective merchant submitting the merchant values.

2. The method as recited in claim 1, wherein comparing the textual description in the first merchant value to a textual description contained in a second merchant value includes utilizing a string comparison algorithm to determine a similarity of the textual description in the first merchant value to the textual description contained in the second merchant value.

3. The method as recited in claim 1, wherein combining multiple weighted textual description similarity scores for the textual description includes calculating a weighted average of a data quality score that is determined from comparing the textual description to textual descriptions submitted by a plurality of merchants.

4. The method as recited in claim 1, wherein the data quality scores correspond to values in a range of 0 to 1.

5. The method as recited in claim 1, wherein the cumulative data quality rating corresponds to an average data quality score for all merchant value submissions by an identified merchant.

6. The method as recited in claim 1, wherein the cumulative data quality rating corresponds to an average data quality score for a subset of merchant value submissions by an identified merchant.

7. The method as recited in claim 1, wherein the cumulative data rating corresponds to an average data quality score for a subset of merchant value submissions by an identified merchant during a specified period of time.

8. The method as recited in claim 1, wherein the cumulative data rating corresponds to an average data quality score for a subset of merchant value submissions by an identified merchant corresponding to a statistical distribution of merchant value submissions.

9. The method as recited in claim 1, wherein selecting a set of textual descriptions for said product includes:
    multiplying textual description data quality scores by respective cumulative data quality ratings associated with a respective merchant submitting respective textual descriptions, thereby generating weighted average scores for the textual descriptions; and
    selecting a set of textual descriptions for said product having higher weighted average scores.

10. A system for managing product descriptions, the system comprising:
    an interface component configured to obtain merchant value submissions from a set of merchants, wherein a merchant value includes a set of textual descriptions for attributes of a product; and
    a merchant value analyzer component configured to determine a data quality score for each textual description in a first merchant value submitted by a first merchant by:
        comparing a textual description in the first merchant value to a textual description contained in a second merchant value submitted by a second merchant, to determine a textual description similarity score;
        weighting the textual description similarity score based on a cumulative data quality rating associated with the second merchant to determine a weighted textual description similarity score; and
        combining multiple weighted textual description similarity scores for the textual description in the first merchant value to determine a data quality score for the textual description in the first merchant value;
    wherein the merchant value analyzer component is further configured to store the first merchant value and the data quality score with a stored plurality of merchant values and data quality scores; and
    wherein the merchant value analyzer component is further configured to select a textual description for an attribute of the product based on a data quality score associated with each textual description and a cumulative data quality rating associated with each respective merchant submitting merchant values.

11. The system as recited in claim 10, wherein the merchant value analyzer component is configured to generate a set of merchant value submissions determined to be directed toward a given product.

12. The system as recited in claim 10, wherein the merchant value analyzer component is configured to utilize a string comparison algorithm to determine a similarity of the textual description in the first merchant value to the textual description contained in the second merchant value.

13. The system as recited in claim 10, wherein the merchant value analyzer component is configured to determine a data quality score for each textual description in a first merchant value by comparing the textual description to textual descriptions submitted by a plurality of merchants.

14. The system as recited in claim 10, wherein the data quality scores correspond to values in a range of 0 to 1.

15. The system as recited in claim 10, wherein the cumulative data quality rating corresponds to an average data quality score for all merchant value submissions by an identified merchant.

16. The system as recited in claim 10, wherein the cumulative data quality rating corresponds to an average data quality score for a subset of merchant value submissions by an identified merchant.

17. The system as recited in claim 10, wherein the cumulative data quality rating corresponds to an average data quality score for a subset of merchant value submissions by an identified merchant for an identified category of products.

18. The system as recited in claim 10, wherein the cumulative data quality rating corresponds to an average data quality score for a subset of merchant value submissions associated with an identified merchant and submitted by at least one identified individual.

19. The system as recited in claim 10, wherein the merchant value analyzer component is configured to select a set of textual descriptions for each product by:
   multiplying textual description data quality scores by respective cumulative data quality ratings associated with a respective merchant submitting respective textual descriptions, thereby generating weighted average scores for the textual descriptions; and
   selecting the textual description with the highest weighted average score.

20. The system as recited in claim 10 further comprising a merchant quality analyzer component for determining a cumulative data rating for each merchant submitting merchant values.

21. The system as recited in claim 20, wherein the merchant quality analyzer component is configured to determine a cumulative data rating as an average of all data quality scores in a given merchant value.

22. The system as recited in claim 20, wherein the merchant quality analyzer component is configured to determine a first cumulative data rating as an average of a subset of data quality scores in the given merchant value.

23. The system as recited in claim 22, wherein the merchant quality analyzer component is configured to determine a second cumulative data rating as an average of a second subset of data quality scores in the given merchant value.

* * * * *